United States Patent
Foitzik et al.

(10) Patent No.: US 11,148,653 B2
(45) Date of Patent: Oct. 19, 2021

(54) METHOD FOR AVOIDING EXCESS PRESSURES IN A PRESSURE MEDIUM CIRCUIT OF AN ELECTRONICALLY SLIP-CONTROLLABLE BRAKING SYSTEM IN THE EVENT OF A DECLINE OF AN INTRINSIC ELASTICITY OF THE BRAKING SYSTEM AND ELECTRONICALLY SLIP-CONTROLLABLE BRAKING SYSTEM

(71) Applicant: Robert Bosch GmbH, Stuttgart (DE)

(72) Inventors: Bertram Foitzik, Ilsfeld (DE); Daniel Frank, Kleinsachsenheim (DE)

(73) Assignee: Robert Bosch GmbH, Stuttgart (DE)

( * ) Notice: Subject to any disclaimer, the term of this patent is extended or adjusted under 35 U.S.C. 154(b) by 162 days.

(21) Appl. No.: 16/513,462

(22) Filed: Jul. 16, 2019

(65) Prior Publication Data

US 2020/0039492 A1 Feb. 6, 2020

(30) Foreign Application Priority Data

Aug. 3, 2018 (DE) .......................... 102018213069.8

(51) Int. Cl.
  *B60T 15/04* (2006.01)
  *B60T 17/22* (2006.01)
  *B60T 8/1761* (2006.01)
  *B60T 13/68* (2006.01)

(52) U.S. Cl.
  CPC ........ *B60T 15/045* (2013.01); *B60T 8/17613* (2013.01); *B60T 13/686* (2013.01); *B60T 17/226* (2013.01)

(58) Field of Classification Search
  CPC ............. B60T 8/17613; B60T 8/17616; B60T 8/4081; B60T 7/042; B60T 13/686; B60T 15/045; B60T 17/226; B60T 2270/10; B60T 2270/80; B60T 8/326; B60T 8/409; B60T 8/176
  USPC ...................................................... 188/106 R
  See application file for complete search history.

(56) References Cited

U.S. PATENT DOCUMENTS

| | | | |
|---|---|---|---|
| 6,692,087 B1 * | 2/2004 | Wolff ...................... | B60T 8/326 188/358 |
| 6,929,102 B1 * | 8/2005 | Schumacher ............. | B60T 7/12 188/162 |
| 2002/0153767 A1 * | 10/2002 | Pasterkamp ............ | B60T 8/409 303/114.1 |

(Continued)

*Primary Examiner* — Robert A. Siconolfi
*Assistant Examiner* — San M Aung
(74) *Attorney, Agent, or Firm* — Norton Rose Fulbright US LLP; Gerard Messina

(57) ABSTRACT

The present invention relates to a method for avoiding excess pressures in a pressure medium circuit of an electronically slip-controllable braking system in the event of a decline of an intrinsic elasticity of the braking system and an electronically slip-controllable braking system. Electronic control units, ascertain a setpoint value for a delivery volume of the pressure generator of these braking systems and convert it into an activation signal for the drive of the pressure generator. In dependence on the prevailing elasticity of the pressure medium circuit, a pressure gradient is established, using which the pressure in the pressure medium circuit changes over time. The ascertainment of an activation signal for the drive of the pressure generator by the electronic control unit is based on the established pressure gradient.

9 Claims, 2 Drawing Sheets

(56) References Cited

U.S. PATENT DOCUMENTS

Figure 1:
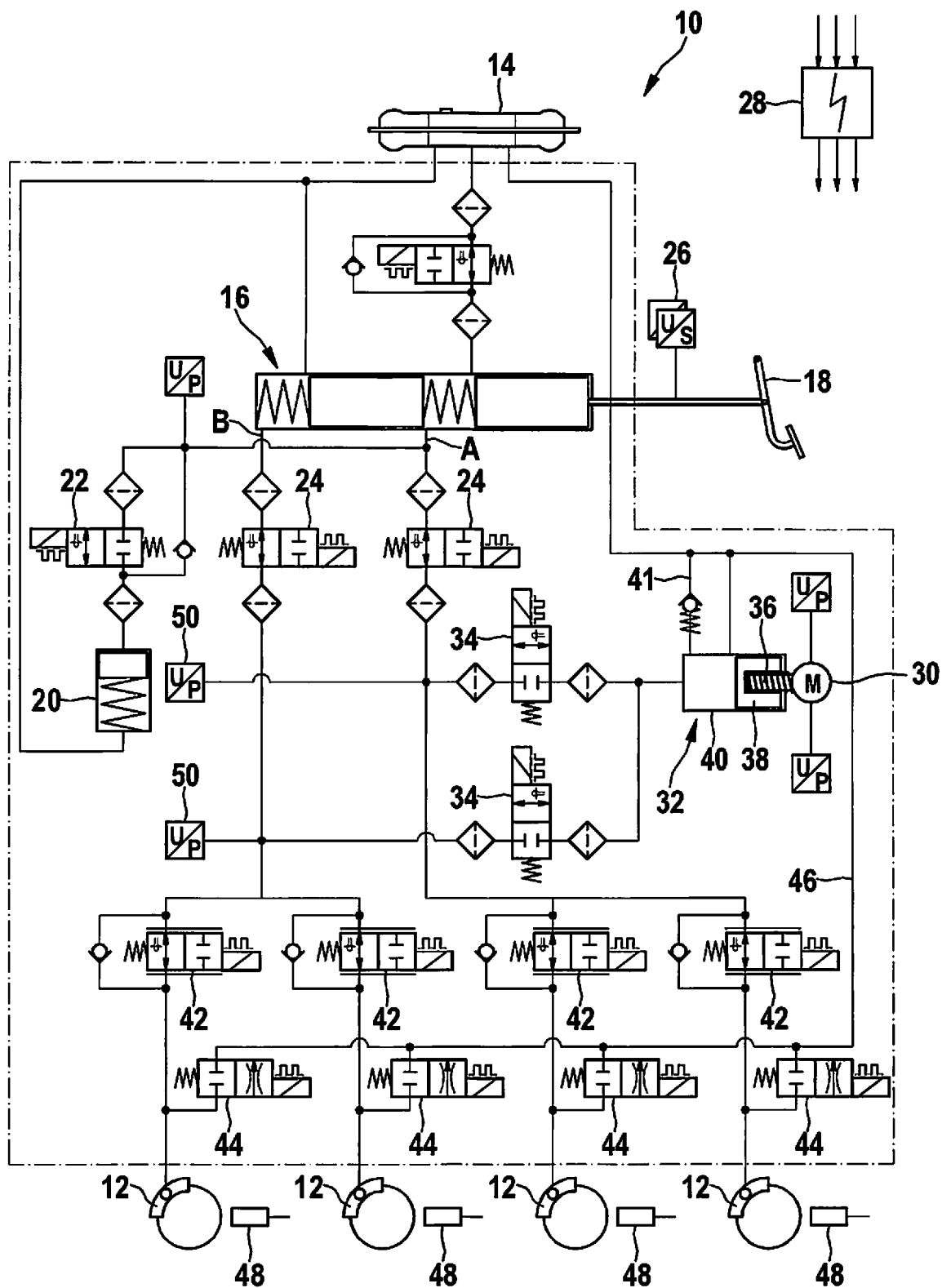

| | | | | |
|---|---|---|---|---|
| 2006/0284482 | A1* | 12/2006 | Yang | B60T 8/32 |
| | | | | 303/191 |
| 2011/0010067 | A1* | 1/2011 | Rubenbauer | B60T 8/172 |
| | | | | 701/70 |
| 2011/0166762 | A1* | 7/2011 | Bunk | B60T 8/1755 |
| | | | | 701/70 |
| 2013/0328386 | A1* | 12/2013 | Strengert | B60T 8/4054 |
| | | | | 303/3 |
| 2014/0032071 | A1* | 1/2014 | Strengert | B60T 8/4072 |
| | | | | 701/70 |
| 2016/0039398 | A1* | 2/2016 | Roll | B60T 8/326 |
| | | | | 303/15 |

* cited by examiner

METHOD FOR AVOIDING EXCESS PRESSURES IN A PRESSURE MEDIUM CIRCUIT OF AN ELECTRONICALLY SLIP-CONTROLLABLE BRAKING SYSTEM IN THE EVENT OF A DECLINE OF AN INTRINSIC ELASTICITY OF THE BRAKING SYSTEM AND ELECTRONICALLY SLIP-CONTROLLABLE BRAKING SYSTEM

CROSS REFERENCE

The present application claims the benefit under 35 U.S.C. § 119 of German Patent Application No. DE 102018213069.8 filed on Aug. 3, 2018, which is expressly incorporated herein by reference in its entirety.

SUMMARY

The present invention relates to a method for avoiding excess pressures in a pressure medium circuit of an electronically slip-controllable braking system in the event of a decline of an intrinsic elasticity of the braking system, and an electronically slip-controllable braking system.

BACKGROUND INFORMATION

Electronically slip-controllable power braking systems for motor vehicles are conventional. The hydraulic layout of such a conventional power braking system 10 is shown by way of example in FIG. 1. It includes a plunger unit as a pressure generator 32, made of a plunger cylinder 40, in which a plunger piston 38 is accommodated in a movable or displaceable manner. Furthermore, a motor is provided to drive this plunger piston 38. This motor is an electric motor 30, which is electronically activatable by a control unit 28 and whose drive power is settable by the current strength emitted thereto by electronic control unit 28. It includes a driveshaft, whose rotational movement is converted by a downstream transmission 36 into a translational movement of plunger piston 38.

Forward-moving plunger piston 38 displaces pressure medium present in plunger cylinder 40 while building up a pressure medium pressure in brake circuits A; B, which are connected to plunger unit 32. The latter are each contacted by way of example with two wheel brakes 12, which are actuated by the brake pressure thus built up. An electronically activatable pressure buildup valve 42 is connected upstream from each connected wheel brake 12. These pressure buildup valves 42 control a pressure medium connection between wheel brakes 12 and associated brake circuit A; B, by interrupting or regulating, i.e., partially or completely opening, this pressure medium connection, and thereby determine the brake pressure prevailing at wheel brake 12. A brake force generated by wheel brake 12 results via the brake pressure, using which finally a vehicle is braked. The brake force is adapted by electronic control unit 28 to the slip conditions, which instantaneously prevail between a wheel of the motor vehicle associated with wheel brake 12 and the roadway. A wheel tending toward locking up is detected by wheel speed sensors 48, which detect the rotational velocity of the wheel and relay it to electronic control unit 28 for evaluation.

To enable a particularly rapid buildup of the brake pressure in wheel brakes 12 and thus the shortest possible braking distance of the vehicle, electric motor 30 of pressure generator 32 is fundamentally operated at higher drive power by electronic control unit 28 and therefore energized using a comparatively high current strength. The driveshaft of the motor accordingly rotates quickly, drives plunger piston 38 rapidly forward, and the generated brake pressure and the volume of the pressure medium displaced per unit of time by plunger piston 38 are accordingly high.

A high dynamic range in the drivetrain of plunger piston 38 may prove to be disadvantageous, however, if the brake pressure in a wheel brake 12 has risen so strongly that the associated wheel threatens to lock up. In this case, pressure buildup valve 42 blocks the pressure-medium-conducting connection between affected wheel brake 12 and brake circuit A; B, so that no further increase of the brake pressure may take place in wheel brake 12.

Due to this hydraulic decoupling of one or possibly multiple wheel brakes 12 simultaneously from brake circuit or circuits A; B, their stiffness increases, because the mechanical elasticity of the particular brake calipers of wheel brakes 12 is thus necessarily no longer available.

The kinetic energy in the plunger movement and in particular in the drive of the plunger unit therefore causes the occurrence of an undesired excess pressure in brake circuits A; B, which strains the driven components or the pressure-subjected components and may have negative effects on the service life thereof.

An avoidance of pressure spikes or excess pressures in brake circuits A; B could be achieved by a general reduction of the drive power delivered by electric motor 30, i.e., by lowering the current strength supplied to electric motor 30, but would then have the disadvantage that the pressure buildup dynamics and thus the braking distance of a vehicle would also worsen, when the risk of one of the wheels of the vehicle locking up is not expected.

SUMMARY

The present invention provides a method which enables an operation of a power braking system 10 with good pressure buildup dynamics, but nonetheless prevents the occurrence of undesired excess pressures in selected operating states of this power braking system.

A method for avoiding excess pressures in a pressure medium circuit of an electronically slip-controllable braking system in the event of a decline of an intrinsic elasticity of this braking system may have the advantage that possible damage originating from such excess pressures on pressure-generating or pressure-subjected components of the braking system is avoided, without a corresponding reduction of the pressure buildup dynamics of the braking system having to be accepted.

According to the present invention, for this purpose a maximum pressure gradient, using which the circuit pressure changes over the operating time of the pressure generator, is established as a function of the prevailing or resulting elasticity of the braking system. The activation signal emitted by the electronic control unit to the drive of the pressure generator is ascertained in consideration of this established pressure gradient.

According to the present invention, the existing or immediately resulting elasticity of the braking system is known from the activation signals, which are stored in the electronic control unit, to the valves controlling the braking system. The activation signals to the control valves of the braking system directly indicate whether a pressure-medium-conducting connection within the braking system is instantaneously open, is just closing, or is already closed, and accordingly permits inferences about the elasticity of the braking system in real time. In addition, the present invention is based on the consideration of establishing a maximum pressure gradient as a function of the established elasticity or elasticity to be expected of the braking system. Using this maximum pressure gradient, a circuit pressure may be adapted to a setpoint value for the circuit pressure by way of the activated pressure generator in such a way that the kinetic energy present in the movement of the drive and the pressure generator does not ultimately result in component-damaging excess pressures as soon the intrinsic elasticity of the pressure medium circuit is supposed to change, in particular decrease.

For the reasons described, the method according to the present invention protects the existing components of the braking system from mechanical overload, thus lengthens their service life, and effectuates a reduction of the operating noise of a braking system. Moreover, the achievable reduction of the load permits the use of more cost-effective components.

Further advantages or advantageous refinements of the present invention are described herein.

The maximum delivery volume of the pressure generator may be determined from the established maximum pressure gradient and the drive speed of the pressure generator may in turn be determined from the delivery volume. This drive speed is settable via the activation signal of the pressure generator.

Protection for an electronically pressure-controllable braking system, which operates according to the method according to the present invention, is sought by a braking system according to the present invention. This braking system is a power braking system, i.e., a braking system in which a braking command is specified, which is then generated by a pressure generator actuated by external force and set by valves of the braking system. The braking command may be specified by a driver by actuating an actuating unit of the braking system or by control electronics, which control the operation of a driverless or autonomously driving vehicle. In a driver-based power braking system, a path simulator is provided to permit an actuating travel of the actuating unit for the driver and to give haptic feedback to the driver. Actuating unit and pressure generator are connected in parallel to one another to a pressure medium circuit in such a braking system.

BRIEF DESCRIPTION OF EXAMPLE EMBODIMENTS

An exemplary embodiment of the present invention is illustrated on the basis of the figures and is explained in detail below.

FIG. 1 shows for this purpose a hydraulic circuit diagram from the related art of an exemplary braking system on which the present invention is based. This circuit diagram shows the components of the braking system on the basis of circuit symbols and the pressure medium connections between these components. This hydraulic circuit diagram was already explained in the introduction to the description.

Figure 2:
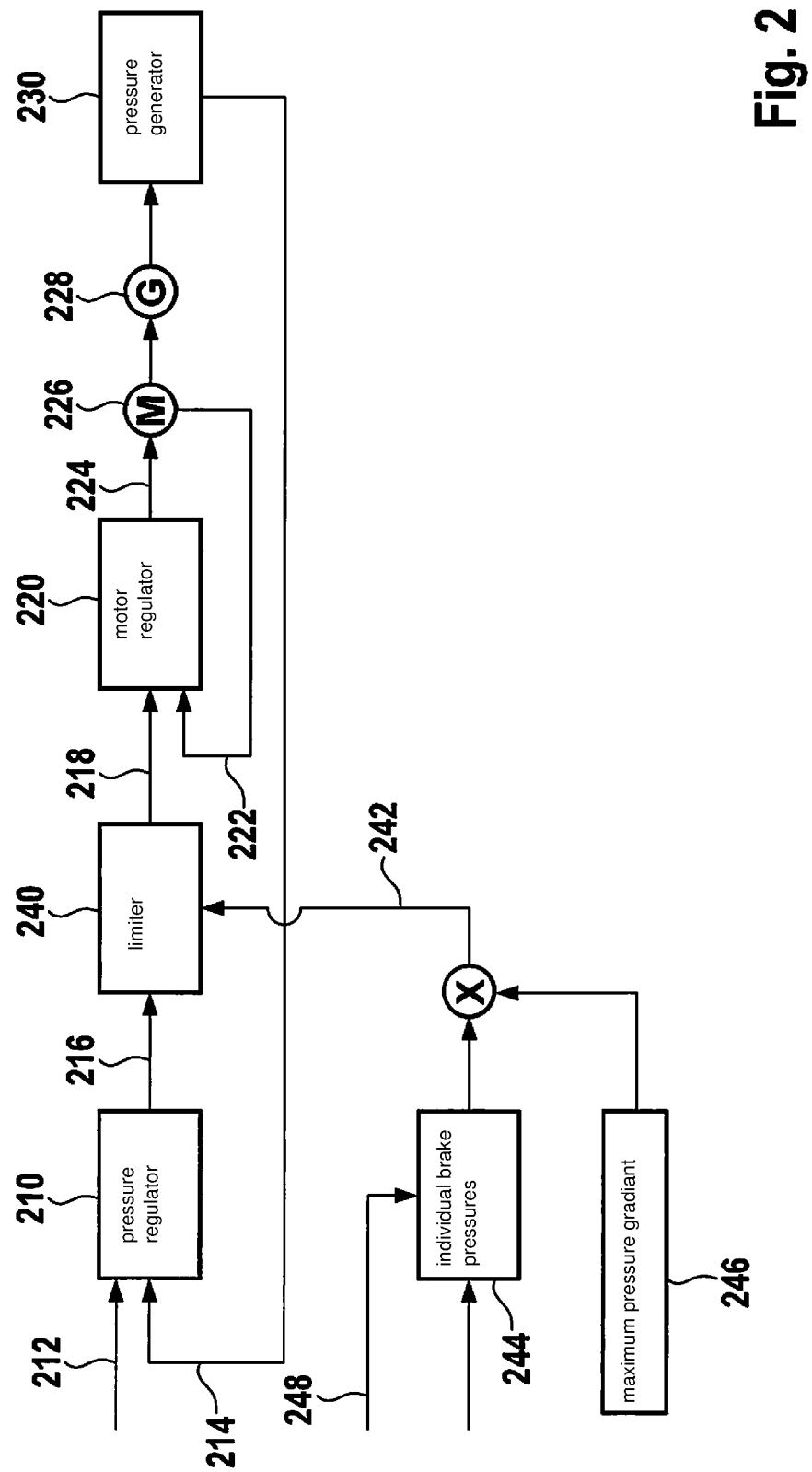

FIG. 2 shows the method according to the present invention on the basis of a simplified schematic flow chart.

DETAILED DESCRIPTION OF EXAMPLE EMBODIMENTS

The method illustrated in FIG. 2 is stored as a data processing program in an electronic control unit 28 activating the components of the power braking system shown in FIG. 1. This data processing program includes, inter alia, a first program part identified as a pressure regulator 210. In the case of an existing braking procedure, a predetermined setpoint value for a brake pressure 212 is compared by this pressure regulator 210 to an actual value 214 measured in brake circuits A; B. If a deviation is established, measured actual value 214 is adapted to specified setpoint value 212 for the brake pressure by electronic activation of, inter alia, a pressure generator 230 of the power braking system. In principle, the pressure adaptation runs with high dynamics, so that changing environmental conditions may be reacted to as rapidly as possible during a braking procedure.

Setpoint value 212 corresponds to a braking command and may be specified, for example, by the actuation of an actuating element of the power braking system by a driver or, in the case of a driver-independent braking procedure, by a sensor system judging the traffic situation. For example, an actuating sensor detects an actuating travel of the actuating element of the power braking system and relays the corresponding signal to the electronic control unit. A setpoint value for the brake pressure to be set by pressure generator 230 is associated with the actuating travel via a characteristic curve stored therein.

Output signal 216 of pressure regulator 210 is a setpoint value for a delivery volume to be displaced in the brake circuits by pressure generator 230 for the brake pressure adaptation. This delivery volume is in turn proportional to an actuating stroke of a plunger piston, the mechanical dimensions of which are known, of actuatable pressure generator 230. Together with the speed at which the plunger piston covers the actuating stroke, the kinetic energy to be applied by the drive of pressure generator 230 or a pressure gradient set in the brake circuits are determined.

A setpoint value for the rotational velocity of the driveshaft of a motor 226 represents a first input signal of a second program part, a so-called motor regulator 220. A second input signal 222 of this motor regulator 220 is an actual value, which is detectable by sensors, for this rotational velocity. From a comparison of both input variables a current signal 224 is ascertained from motor regulator 220 and output to motor 226 driving the plunger piston. A mechanical transmission 228 of known transmission ratio, which converts the rotational movement of a driveshaft of motor 226 into a linear movement of the plunger piston in pressure generator 230, is located between this motor 226 and pressure generator 230.

The pressure medium volume displaced by the plunger piston in the brake circuits finally determines the sensorially measurable actual value 214, which is processed in pressure regulator 210, for the brake pressure in the brake circuits.

According to the present invention, a so-called limiter 240 is connected in series between pressure regulator 210 and motor regulator 220. A maximum pressure gradient is established by this limiter 240, using which the brake pressure changes in the brake circuits in the case of a required brake pressure adaptation. Limiter 240 includes for this purpose as input variables setpoint value 216 for the delivery volume output by pressure regulator 210 and a limiting value 242 for a maximum delivery volume to be output of pressure generator 240. Latter limiting value 242 is in turn established in dependence on the mechanical elasticity of the pressure-subjected parts of the entire power braking system. This elasticity of the braking system is not directly measurable and is therefore determined from individual brake pressures 244 of the individual wheels and activation signals 248 existing in the electronic control unit, which uses the pressure medium flow in the valves controlling the power braking system. These valves delimit the area subjected to brake pressure inside the power braking system. To determine the elasticity, the activation signals of all valves of the power braking system, for example, also the valves which control a connection between the brake circuits and a simulator, a connection of the braking system to a master brake cylinder, or a connection of the pressure generator to the brake circuits, are taken into consideration. The background is that these activation signals 244 indicate whether the valves occupy their open position or their closed position or whether an activation of the valves has already been requested but is not yet implemented. Valves which are already closed or are about to close determine the area subjected to brake pressure of the power braking system. In conjunction with preceding elasticity measurements of the vehicle braking system in the laboratory, the mechanical elasticity of the pressure-subjected area of the power braking system is thus known or at least already able to be estimated beforehand in a very good approximation.

Depending on the elasticity ascertained in this manner, the pressure change in the braking system is set in such a way that in the event of a potential further decline of the elasticity, the kinetic energy present in the drive of pressure generator 230 does not result in undesired pressure spikes or excess pressures in the subjected brake circuits. For this purpose, a maximum pressure gradient 246 is established and offset with the estimated total elasticity of the power braking system to obtain a maximum delivery volume of pressure generator 230. Setpoint value 216 specified by pressure regulator 210 for the delivery volume is compared by limiter 240 to this ascertained limiting or maximum value 242. If setpoint value 216 is to be higher than limiting value 242, the delivery volume and the delivery rate, i.e., the pressure medium volume delivered by pressure generator 230 per unit of time are limited via the actuating travel and the actuating speed of the plunger piston. Motor regulator 220 reduces a corresponding current signal to motor 226 of pressure generator 230 for this purpose and thus drives it at a reduced speed. As soon as the required pressure medium volume has been displaced in the brake circuits by pressure generator 230, the electronic activation of motor 226 is withdrawn by the electronic control unit. The resulting period of time until pressure generator 230 completely stops the pressure medium delivery is extremely short and a pressure medium volume displaced during this period of time does not cause excess pressures which damage the components of the power braking system.

Of course, modifications or additions to the described exemplary embodiment are conceivable, without deviating from the described basic concept of the present invention.

It is to be noted in this context that the present invention has solely been described by way of example on the basis of a power braking system, whose pressure generator 230 is equipped with a plunger piston. A transfer of the present invention to power braking systems which include piston pumps, gearwheel pumps, or the like as pressure generators would also be possible.

What is claimed is:

1. A method for avoiding excess pressures in a pressure medium circuit of an electronically slip-controllable braking system in the event of a decline of an intrinsic elasticity of the braking system, the pressure medium circuit being equipped with a pressure generator which applies a circuit pressure to the pressure medium circuit, an activatable drive of the pressure generator, and an electronic control unit, by which a setpoint value for a delivery volume of the pressure generator is ascertained during a braking procedure by a comparison of a setpoint value to an actual value for the circuit pressure in the pressure medium circuit and converted into an activation signal for the drive of the pressure generator, the method comprising:
establishing, depending on existing elasticity or the elasticity to be expected of the braking system, a maximum pressure gradient with which the pressure in the pressure medium circuit changes, the maximum pressure gradient being based on an ascertainment of an activation signal for the drive of the pressure generator by the electronic control unit, wherein a limiting value for the delivery volume of the pressure generator is determined from the elasticity of the pressure medium circuit and the established pressure gradient, the delivery volume corresponding to the limiting value being less than the delivery volume corresponding to the setpoint value.

2. The method as recited in claim 1, wherein the determined limiting value for the delivery volume of the pressure generator is compared to the computed setpoint value for the delivery volume of the pressure generator in the electronic control unit and via the activation signal at the drive of the pressure generator, the delivery volume of this pressure generator is limited to the limiting value when the setpoint value for the delivery volume is greater than the limiting value for the delivery volume.

3. The method as recited in claim 1, wherein a drive speed at which the pressure generator is driven is established using the activation signal at the drive of the pressure generator.

4. The method as recited in claim 1, wherein the elasticity of the pressure medium circuit is derived from the activation signals, which are present in the electronic control unit, of all valves of the braking system.

5. An electronically slip-controllable braking system for a motor vehicle, comprising:
a pressure generator, by which a circuit pressure may be applied to a pressure medium circuit of the braking system;
an activatable drive for the pressure generator; and
an electronic control unit, which ascertains a setpoint value for a delivery volume of the pressure generator by a comparison of a setpoint value to an actual value and converts it into an activation signal for the drive of the pressure generator, wherein the electronic control unit being configured to establish, depending on existing elasticity or the elasticity to be expected of the braking system, a maximum pressure gradient with which the pressure in the pressure medium circuit changes, the maximum pressure gradient being based on an ascertainment of an activation signal for the drive of the pressure generator by the electronic control unit, wherein a limiting value for the delivery volume of the pressure generator is determined from the elasticity of the pressure medium circuit and the established pressure gradient, the delivery volume corresponding to the limiting value being less than the delivery volume corresponding to the setpoint value.

6. The electronically slip-controllable braking system as recited in claim 5, wherein the pressure generator and an actuating unit, via which a braking command is specified by a driver to the braking system, are connected in parallel to one another to the pressure medium circuit of the braking system.

7. The electronically slip-controllable braking system as recited in claim 5, wherein the braking system is a power braking system, which is equipped with a pressure generator driven by external force depending on a braking command specification and a path simulator supplying haptic feedback to a driver.

8. The method as recited in claim 1, wherein, in response to the maximum pressure gradient, the pressure generator is driven at a reduced speed.

9. The electronically slip-controllable braking system as recited in claim 5, wherein, in response to the maximum pressure gradient, the pressure generator is driven at a reduced speed.

\* \* \* \* \*